Feb. 11, 1958      C. F. SCHAUS      2,823,017
SUPPORT FOR ELECTRIC MIXER
Filed Dec. 27, 1955
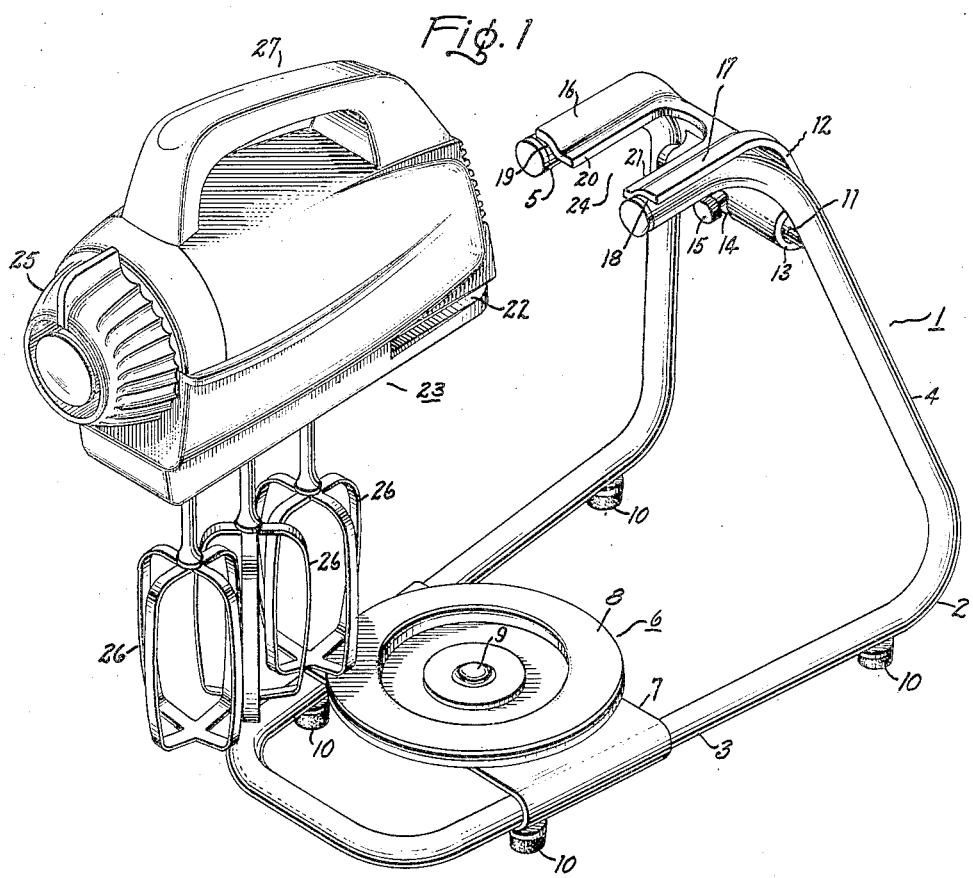
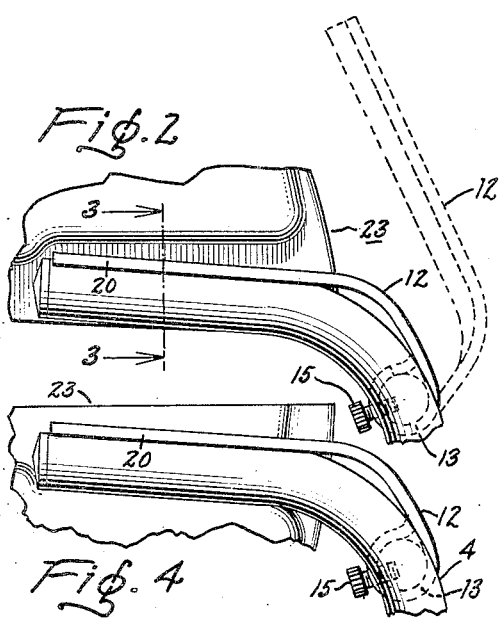
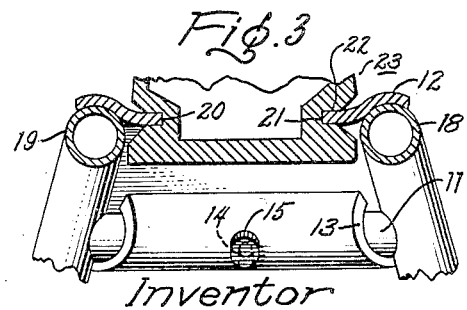
Inventor
Carl Fredrick Schaus
by Merton D Morse
His Attorney

United States Patent Office 2,823,017
Patented Feb. 11, 1958

2,823,017

SUPPORT FOR ELECTRIC MIXER

Carl F. Schaus, Hagaman, N. Y., assignor to General Electric Company, a corporation of New York Application December 27, 1955, Serial No. 555,347

1 Claim. (Cl. 259—108)

My invention relates to electric mixers and similar devices. More particularly it relates to a new and improved support for such devices.

Prior art supports for electric mixers and similar equipment have generally been of relatively heavy cast metal types provided with a hinged upper portion forming a part of the mixer motor frame or having provision for attaching the motor thereto. The relatively heavy cast metal support detracts from the usefulness and portability of such appliances. Additionally such frames often provide only for the attachment of the motor thereto in an operative or upright position in which the motor extends above the support proper. This latter feature requires that for storage the motor portion be entirely removed from the support and be stored separately or that additional head room be provided in the storage space for the upwardly extending motor. The removal of the motor from the support is often not easily provided for with the result that a rather large space is required for stowing or storing the appliance when not in actual use. This latter feature also detracts from the ready use of the appliance motor portion as a portable or hand appliance.

It is an object of my invention to provide an electric mixer or similar appliance having a unique and useful support of simple and light weight construction which permits ready removal of the motor portion for use as a hand or portable appliance and permits the reversal of the mixer portion in its support from its normal operative position for inverted operation and easy and compact storage.

Briefly my invention comprises an elongated member formed to provide a generally U-shaped, or V-shaped, base having a receptacle receiving base of usual type fixed thereto nearer the apex of the V. The free arms of the member are bent generally upwardly from the base and inwardly to form an inverted V open at its apex and then horizontally parallel to the base and to each other to form an upper support portion. Hinged to the support is a mixer-receiving bracket which mates with a bracket engaging means on the mixer body. The hinged bracket permits the usual upward swinging motion of the motor, permits the mixer body to be removed from the bracket for separate use and provides for storage of the mixer in an inverted-compact position on the support.

The features of my invention which I believe to be novel are set forth with particularlity in the claim appended hereto. My invention, itself, however, both as to its organization and method of operation, together with further objects and advantages thereof may best be understood from a consideration of the following description and the drawing in which Fig. 1 is a perspective view of an electric mixer embodying the support of my invention and with the mixer body removed therefrom, Fig. 2 is a partial side elevation view of my invention showing the motor bracket structure with the mixer body in place, Fig. 3 is a view of Fig. 2 along the lines 3—3, and Fig. 4 is a partial side elevation view showing the mixer body in its storage or inverted position on the bracket.

Referring to Fig. 1, support 1 is shown having a basic member 2 of elongated tubular or rod-like form. It will be understood, of course, that member 2 may be other than round in cross-section although such a section affords a strong, smooth, easily cleaned surface. Member 2 is formed as shown to form a horizontal, generally U-shaped, or V-shaped, base portion 2 or one of other shape as desired. The free arms of member 2 at their widest point are bent in a generally upward, inward, and in sloping fashion to form the upright portion 4 of the support after which the arms are bent horizontally and parallel to base portion 3 to form an upper support portion 5. Fixed to the base portion 3 near the apex of the V is a receptacle holder 6 of any usual type comprising a plate 7 which is bent around the arms of member 2 as shown or otherwise fixed thereto. Mounted on this plate 7 is a rotatable member 8 pivoted at 9 in the usual manner. Feet or pads 10 may be provided on base 3 to prevent the marring of surfaces on which the mixer rests. The screw or other attaching means for one set of feet may also be utilized to anchor plate 7 in place. It is obvious, of course, that three instead of four feet 10 may be used with those at the receptacle holder, replaced by a single foot at the closed loop of the base. If desired, cross bars may be placed across base 3 in addition to plate 7 but this is not necessary under usual circumstances.

A cross-bar 11 is placed between the arms of upright support portion 4 to close the inverted V near its apex. This cross-bar serves to maintain the spaced-relation of the arms and also serves as a pin for hinged mixer body bracket 12. As shown one end of bracket 12 is wrapped around pin 11 as at 13 to provide a hinged effect with a slot 14 provided in part 13 to receive a detent or pin 15 which limits the hinged movement or arc of travel of the bracket as desired. Bracket 12 is shaped to conform to the transition curve of member 4 from the upright to the horizontal upper support portion 5 on which the bracket 12 rests. Bracket 12 has a bifurcated or forked upper portion forming arms 16 and 17, the latter being formed as at 18 and 19 to conform to the shape of member 4 or upper support portion 5. The inner edges 20 and 21 respectively mate or engage slidably and snugly with corresponding recoesses 22 in mixer body 23, the body portion fitting in the space 24 described by arms 18 and 19. Mixer body 23 is easily removable from the bracket by a slight sliding pressure exerted thereon.

In Fig. 2, mixer body 23 is shown at rest on the support 1 and engaged with bracket 12. Also shown in Fig. 2 in dotted lines is bracket 12 in its raised position. The relationship of mixer body 23 to bracket 12 and support 1 is well shown in Fig. 3, the slots or recesses 20 and 21 in mixer body 23 snugly engaging in slidable manner with the edges 20 and 21 of bracket 12. While normally no fastening means is required to hold mixer body 23 in engagement with bracket 12, any conventional means such as spring loaded detents may be placed in the mixer body with mating recesses in the bracket. Alternatively the edges 20 nad 21 of bracket 12 may be vertically sprung slightly out of a straight line so as to grip recesses 22 more securely or the recesses themselves may be made slightly restricted. In Fig. 4, mixer body 23 is shown positioned in bracket 12 in inverted fashion to permit easy storage of the mixer with minimum head room. Mixer body 23 may be of the usual type having a handle 27 thereon, a speed control knob 25 and one or more beaters 26.

By my invention there is provided a support for a mixer or other similar appliance which is light, strong, easy to clean and to which the appliance body itself may be attached in readily detachable fashion or in inverted fashion for inverted operation or easy storage.

While I have described certain specific embodiments of my invention, I wish it to be understood that I desire to protect in the following claim all changes or modifications thereto which fall within the spirit and scope of this claim.

What I claim as new and desire to secure by Letters Patent of the United States is:

In combination, a household electric mixer, a support for said household electric mixer comprising a single bar bent about substantially its midpoint to form two equal integral legs, said legs substantially forming a V in the horizontal plane, said legs extending upwardly and inwardly from the wide portion of said V to form an inverted V, and thence backwardly parallel to said plane and to each other, said inverted V formed by said legs being open at its apex sufficiently to receive the body of said mixer between said backwardly extending portions of said legs, a carrier adapted to carry a receptacle in which food is to be mixed bridged across said horizontal V nearer the apex thereof, a bar bridging said legs near but below the horizontal backwardly extending portions of said legs, and a hinge mounted to rotate about said last bar and comprising a bifurcated member having mixer holder legs shaped to rest on said backwardly projecting horizontal portions of said first bar, and having flanges projecting inwardly from said legs and adapted to mate with grooves in the opposite sides of the body of said mixer during normal operation of the mixer to support the mixer in position to mix food in said receptacle whereby said bifurcated hinge member may be rotated about said rod to lift the mixer from said receptacle and the mixer body may be slid off from said flanges and removed from said support.

References Cited in the file of this patent
UNITED STATES PATENTS

| | | |
|---|---|---|
| 2,100,923 | Schmidt et al. | Nov. 30, 1937 |
| 2,326,996 | Fuge | Aug. 17, 1943 |
| 2,343,757 | Egedal | Mar. 7, 1944 |